(12) United States Patent
Ivakitch et al.

(10) Patent No.: US 11,624,293 B2
(45) Date of Patent: Apr. 11, 2023

(54) VARIABLE GUIDE VANE ASSEMBLY AND BUSHING THEREFOR

(71) Applicant: PRATT & WHITNEY CANADA CORP., Longueuil (CA)

(72) Inventors: Richard Ivakitch, Scarborough (CA); Daniel Poick, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/170,140

(22) Filed: Feb. 8, 2021

(65) Prior Publication Data

US 2022/0251967 A1  Aug. 11, 2022

(51) Int. Cl.
| | |
|---|---|
| *F01D 17/16* | (2006.01) |
| *F02C 7/06* | (2006.01) |
| *F16C 33/04* | (2006.01) |
| *F16C 33/06* | (2006.01) |
| *F16C 33/08* | (2006.01) |

(52) U.S. Cl.
CPC .............. *F01D 17/162* (2013.01); *F02C 7/06* (2013.01); *F16C 33/04* (2013.01); *F16C 33/043* (2013.01); *F16C 33/06* (2013.01); *F16C 33/08* (2013.01); *F05D 2220/323* (2013.01); *F05D 2240/12* (2013.01); *F16C 2208/20* (2013.01); *F16C 2208/58* (2013.01); *F16C 2208/60* (2013.01); *F16C 2360/23* (2013.01)

(58) Field of Classification Search
CPC .......... F02C 7/06; F16C 33/04; F16C 33/043; F16C 33/06; F16C 33/08; F16C 2208/20; F16C 2208/58; F16C 2208/60; F16C 2360/23; F16C 33/74
See application file for complete search history.

(56) References Cited

U.S. PATENT DOCUMENTS

| | | | | | |
|---|---|---|---|---|---|
| 2,956,841 | A | * | 10/1960 | Steele, III | F04D 29/047 384/215 |
| 3,079,128 | A | * | 2/1963 | Burge | F01D 17/162 415/191 |

(Continued)

OTHER PUBLICATIONS

European Search Report issued in counterpart application 22155484.3 dated Jun. 30, 2022.

*Primary Examiner* — Juan G Flores
*Assistant Examiner* — Brian Christopher Delrue
(74) *Attorney, Agent, or Firm* — Norton Rose Fulbright Canada LLP.

(57) ABSTRACT

A gas turbine engine, has: an annular gaspath extending around a central axis, the annular gaspath defined between a first casing and a second casing, the first casing defining pockets; and a variable guide vane assembly having: variable guide vanes circumferentially distributed around the central axis, the variable guide vanes having airfoils extending into the annular gaspath and extending between first and second pivot members at respective first and second ends of the airfoils, the variable guide vanes rotatable about respective spanwise axes, bushings received within the pockets of the first casing, the first pivot members of the variable guide vanes rollingly engaged to the bushings, and resilient members disposed radially between surfaces of the first casing and the bushings relative to the spanwise axes, the resilient members in abutment against both of the surfaces of the first casing and the bushings.

19 Claims, 5 Drawing Sheets

(56) References Cited

U.S. PATENT DOCUMENTS

| | | | | |
|---|---|---|---|---|
| 5,636,968 | A * | 6/1997 | Audet | F01D 17/162 |
| | | | | 415/160 |
| 7,121,727 | B2 * | 10/2006 | Bruce | F01D 17/162 |
| | | | | 384/297 |
| 7,753,647 | B2 * | 7/2010 | Giaimo | F01D 17/162 |
| | | | | 415/160 |
| 10,494,937 | B2 * | 12/2019 | Tomsik | F01D 25/246 |
| 2009/0200793 | A1 * | 8/2009 | Smith, III | F16J 15/3268 |
| | | | | 285/111 |
| 2013/0251518 | A1 * | 9/2013 | Eleftheriou | F04D 9/042 |
| | | | | 415/208.1 |
| 2014/0234085 | A1 | 8/2014 | Maliniak | |
| 2018/0058231 | A1 | 3/2018 | Tomsik | |
| 2019/0017408 | A1 | 1/2019 | Ruberte Sanchez | |
| 2021/0340873 | A1 * | 11/2021 | Simpson | F16K 31/124 |

* cited by examiner

FIG. 1

VARIABLE GUIDE VANE ASSEMBLY AND BUSHING THEREFOR

TECHNICAL FIELD

The disclosure relates generally to gas turbine engines, and more particularly to variable guide vanes assemblies as may be present in a compressor section and/or a turbine section of a gas turbine engine.

BACKGROUND OF THE ART

In a gas turbine engine, air is pressurized by rotating blades within a compressor, mixed with fuel and then ignited within a combustor for generating hot combustion gases, which flow downstream through a turbine for extracting energy therefrom. Within the compressor of the engine, the air is channelled through circumferential rows of vanes and blades that pressurize the air in stages. Variable guide vanes (VGVs) are sometimes used within compressors and/or turbines, and provide vanes which are rotatable such that an angle of attack they define with the incoming flow may be varied. Improvements with such variable guide vane assemblies is sought.

SUMMARY

In one aspect, there is provided a gas turbine engine, comprising: an annular gaspath extending around a central axis, the annular gaspath defined between a first casing and a second casing, the first casing defining pockets; and a variable guide vane assembly having: variable guide vanes circumferentially distributed around the central axis, the variable guide vanes having airfoils extending into the annular gaspath and extending between first and second pivot members at respective first and second ends of the airfoils, the variable guide vanes rotatable about respective spanwise axes, bushings received within the pockets of the first casing, the first pivot members of the variable guide vanes rollingly engaged to the bushings, and resilient members disposed radially between surfaces of the first casing and the bushings relative to the spanwise axes, the resilient members in abutment against both of the surfaces of the first casing and the bushings.

In some embodiments, the surfaces of the first casing are defined by peripheral walls of the first casing, each of the peripheral walls circumscribing a respective one of the pockets.

In some embodiments, the resilient members are disposed radially between the peripheral walls and the bushings relative to the spanwise axes.

In some embodiments, the bushings define grooves extending circumferentially around the spanwise axes, each of the resilient members being annular and received within a respective one of the grooves.

In some embodiments, the first pivot members are stems protruding from the airfoils along the spanwise axes, the stems rollingly engaged to the bushings by being rotatably received within apertures defined by the bushings.

In some embodiments, the bushings define bores extending outwardly from the apertures to outer circumferential faces of the bushings, the bores sized to receive a tool for removing the resilient members.

In some embodiments, the resilient members are made of an elastomeric material.

In some embodiments, the resilient members are sealing members.

In some embodiments, the sealing members are O-rings or C-seals.

In some embodiments, the first casing is located radially inwardly of the second casing relative to the central axis.

In some embodiments, the first casing is made of a metallic material and the bushings are made of a composite material.

In another aspect, there is provided a variable guide vane (VGV) assembly for a gas turbine engine, comprising: variable guide vanes circumferentially distributed about a central axis, the variable guide vanes having airfoils extending between first and second pivot members at respective first and second ends of the airfoils, the variable guide vanes rotatable about respective spanwise axes; bushings sized to be received within pockets of a casing of the gas turbine engine, the first pivot members of the variable guide vanes rollingly engaged to the bushings; and means engaged to the bushings for damping movements of the bushings relative to the pockets.

In some embodiments, the means are sealing members.

In some embodiments, the sealing members are made of an elastomeric material.

In some embodiments, the sealing members are C-seals.

In some embodiments, the bushings define grooves extending circumferentially around the spanwise axes, each of the means received within a respective one of the grooves.

In some embodiments, the first pivot members are stems protruding from the airfoils along the spanwise axes, the stems rollingly engaged to the bushings by being rotatably received within apertures defined by the bushings.

In some embodiments, the bushings define bores extending outwardly from the apertures to outer circumferential faces of the bushings, the bores sized to receive a tool for removing the resilient members.

In yet another aspect, there is provided a vane bushing assembly for a vane of a gas turbine engine, comprising: a bushing having an annular body extending circumferentially around a bushing axis, the annular body defined radially between a first circumferential surface and a second circumferential surface relative to the bushing axis, the first circumferential surface sized to be rollingly engaged by a vane of the variable guide vane assembly; and a resilient member extending around the bushing axis of the bushing and engaged to the second circumferential surface.

In some embodiments, the resilient member is a sealing member.

DESCRIPTION OF THE DRAWINGS

Reference is now made to the accompanying figures in which.

DETAILED DESCRIPTION

The following disclosure relates generally to gas turbine engines, and more particularly to assemblies including one or more struts and variable orientation guide vanes as may be present in a compressor section and/or in a turbine section of a gas turbine engine. In some embodiments, the assemblies and methods disclosed herein may promote better performance of gas turbine engines, such as by improving flow conditions in the compressor section in some operating conditions, improving the operable range of the compressor, reducing energy losses and aerodynamic loading on rotors.

Figure 1:
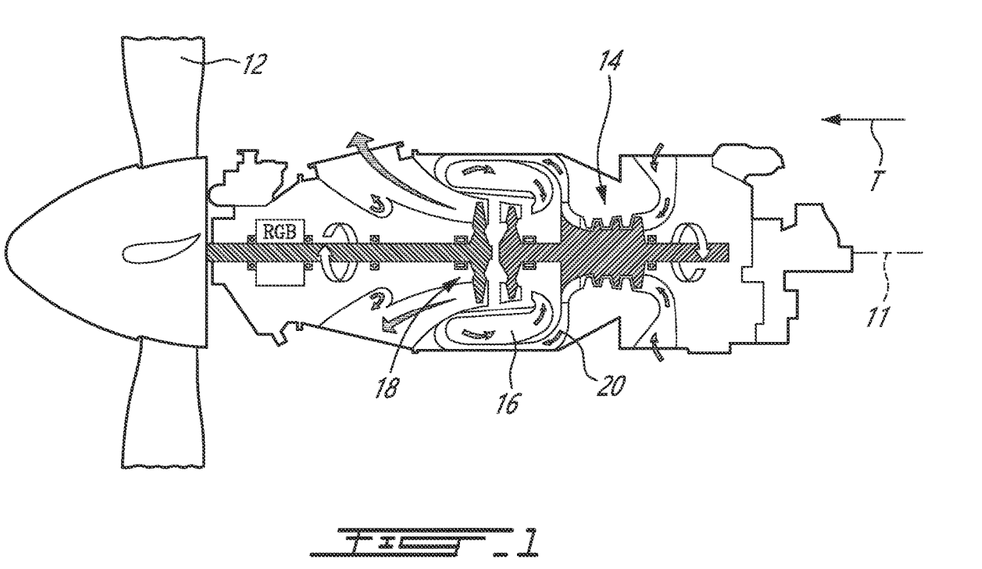
FIG. 1 is a schematic cross sectional view of a gas turbine engine.

FIG. 1 illustrates a gas turbine engine 10 of a type preferably provided for use in subsonic flight, and in driving engagement with a rotatable load, which is depicted as a propeller 12. The gas turbine engine has in serial flow communication a compressor section 14 for pressurizing the air, a combustor 16 in which the compressed air is mixed with fuel and ignited for generating an annular stream of hot combustion gases, and a turbine section 18 for extracting energy from the combustion gases.

It should be noted that the terms "upstream" and "downstream" used herein refer to the direction of an air/gas flow passing through an annular gaspath 20 of the gas turbine engine 10. It should also be noted that the term "axial", "radial", "angular" and "circumferential" are used with respect to a central axis 11 of the gaspath 20, which may also be a central axis of gas turbine engine 10. The gas turbine engine 10 is depicted as a reverse-flow engine in which the air flows in the annular gaspath 20 from a rear of the engine 10 to a front of the engine 10 relative to a direction of travel T of the engine 10. This is opposite than a through-flow engine in which the air flows within the gaspath 20 in a direction opposite the direction of travel T, from the front of the engine towards the rear of the engine 10. The principles of the present disclosure may apply to reverse-flow and through-flow engines and to any other gas turbine engines, such as a turbofan engine and a turboshaft engine.

Figure 2:
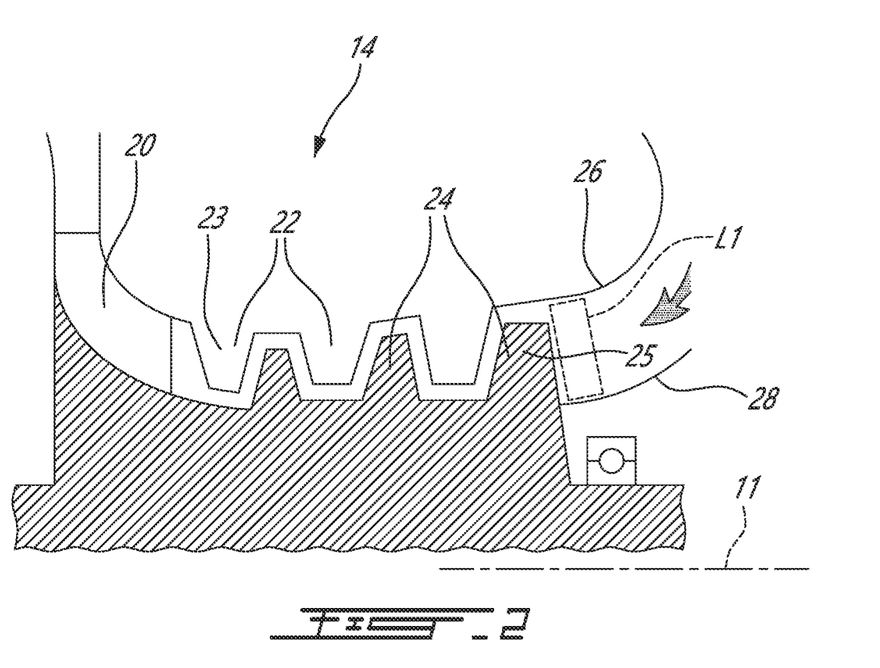
FIG. 2 is an enlarged view of a portion of FIG. 1.

Referring now to FIG. 2, an enlarged view of a portion of the compressor section 14 is shown. The compressor section 14 includes a plurality of stages, namely three in the embodiment shown although more or less than three stages is contemplated, each stage including a stator 22 and a rotor 24. The rotors 24 are rotatable relative to the stators 22 about the central axis 11. Each of the stators 22 includes a plurality of vanes 23 circumferentially distributed about the central axis 11 and extending into the annular gaspath 20. Each of the rotors 24 also includes a plurality of blades 25 circumferentially distributed around the central axis 11 and extending into the gaspath 20. The rotors 24 and thus the blades 25 are thereof rotating about the central axis 11. As will be seen in further detail below, at least one of the stators 22 includes vanes 23 which are variable guide vanes (VGVs) and thus includes a variable guide vane assembly 40 as will be described.

In the depicted embodiment, the annular gaspath 20 is defined radially between an outer casing or wall 26 and an inner casing or wall 28. The vanes 23 and the blades 25 extend radially relative to the central axis 11 between the outer and inner casings 26, 28. "Extending radially" as used herein does not necessarily imply extending perfectly radially along a ray perfectly perpendicular to the central axis 11, but is intended to encompass a direction of extension that has a radial component relative to the central axis 11. The vanes 23 can be fixed orientation or variable orientation guide vanes (referred hereinafter as VGVs). Examples of rotors include fans, compressor rotors (e.g. impellers), and turbine rotors (e.g. those downstream of the combustion chamber).

Figure 3:
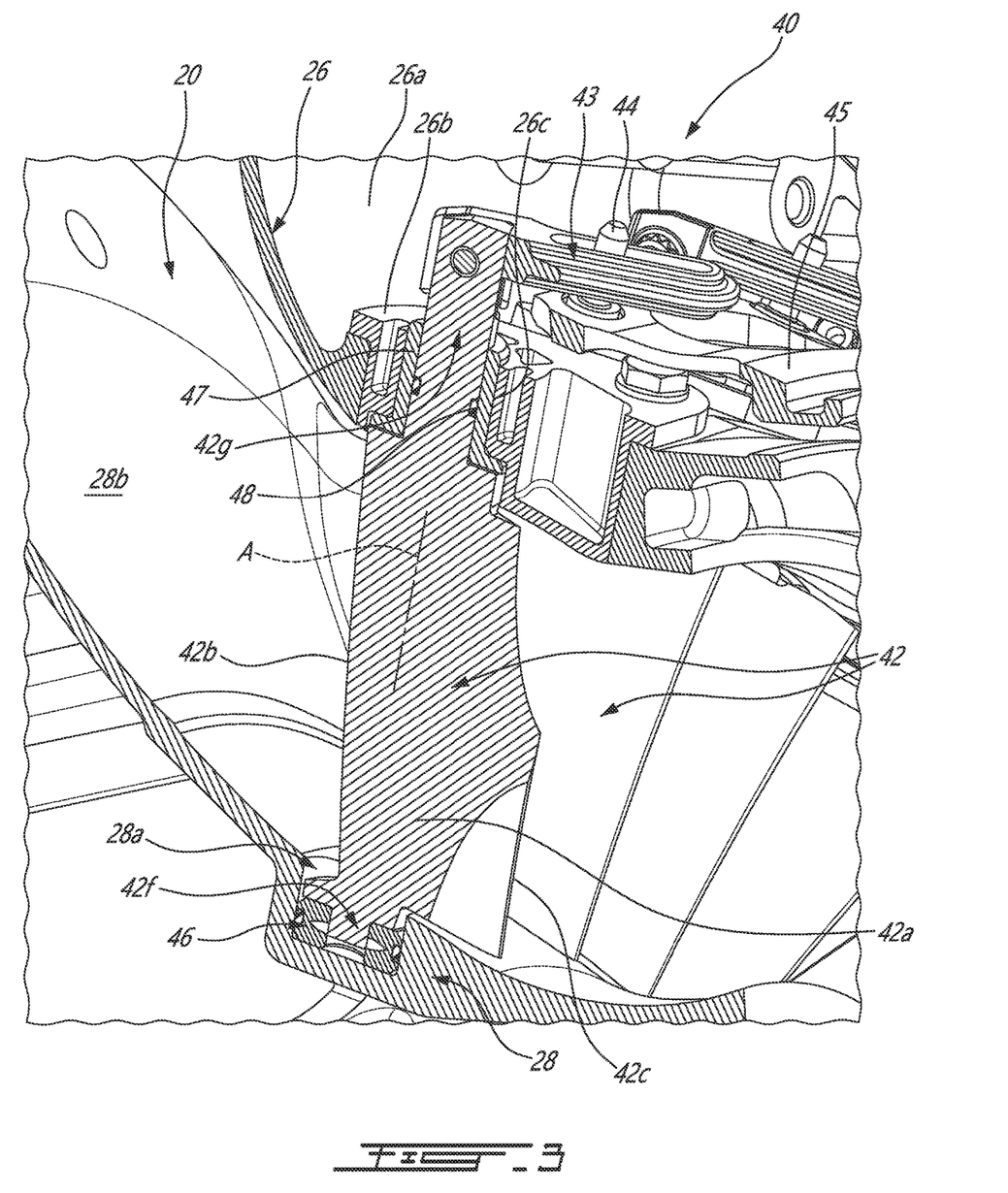
FIG. 3 is a three dimensional cutaway view of a portion of a variable guide vane (VGV) assembly in accordance with one embodiment to be used with the engine of FIG. 1.

Referring to FIG. 3, an example of a variable guide vane (VGV) assembly of a stator 22 of the engine 10 is shown at 40. Any of the stators 22 of the compressor section 14 depicted in FIG. 2 may be embodied as a variable guide vane 40. It will be appreciated that, in some cases, the VGV assembly 40 may be used as a stator of the turbine section 18 of the engine 10 without departing from the scope of the present disclosure. The VGV assembly 40 may be located at an upstream most location L1 (FIG. 2) of the compressor section 14. That is, the VGV assembly 40 may be a variable inlet guide vane assembly.

The VGV assembly 40 includes a plurality of vanes 42 circumferentially distributed about the central axis 11 (FIG. 2) and extending radially between the inner casing 28 (FIG. 2) and the outer casing 26. In the present embodiment, the vanes 42 are rotatably supported at both of their ends by the inner and outer casings 28, 26. Particularly, each of the vanes 42 has an airfoil 42a having a leading edge 42b and a trailing edge 42c both extending along a span of the airfoil 42a. Each of the vanes 42 has an inner pivot member 42f at an inner end of the airfoil 42a and an outer pivot member 42g at an outer end of the airfoil 42a. The inner and outer pivot members 42f, 42g are depicted in present embodiment as stems, or shafts. The inner and outer pivot members 42f, 42g are rollingly engaged to the inner and outer casings, 28, 26, respectively. The vanes 42 are rotatable about respective spanwise axes A to change an angle of attack defined between the vanes 42 and a flow flowing within the annular gaspath 20. In the embodiment shown, the spanwise axes A extend between the inner and outer stems 42f, 42g of the vanes 42.

In the embodiment shown, the inner and outer pivot members 42f, 42g are stems and are referred to herein below as inner and outer stems 42f, 42g. However, it is understood that other type of pivot members, such as annular members, may be used without departing from the scope of the present disclosure. Such annular members may be sized to engage cylindrical portions defined by the casing and protruding therefrom.

In the embodiment shown, the outer stems 42g of the vanes 42 are secured to vane arms 43. The vane arms 43 are engaged by pins 44 mounted on a unison ring 45 that is rollingly engaged to the outer casing 26 for rotation relative to the outer casing 26 about the central axis 11. The unison ring 45 is drivingly engaged by an actuator, such as a hydraulic actuator. Powering the actuator results in the rotation of the unison ring 45 about the central axis 11 and in a sliding motion of the pins 44 within slots defined by the vane arms 43. This result in the rotation of the vanes 42 about their respective spanwise axis A for changing the angle of attack defined between the vanes 42 and the flow flowing in to the annular gas path 20. More detail about the unison ring 45 and the vane arms 43 are presented in U.S. patent application Ser. No. 17/108,937 filed on Dec. 1, 2020, the entire contents of which are incorporated herein by reference.

Figure 4:
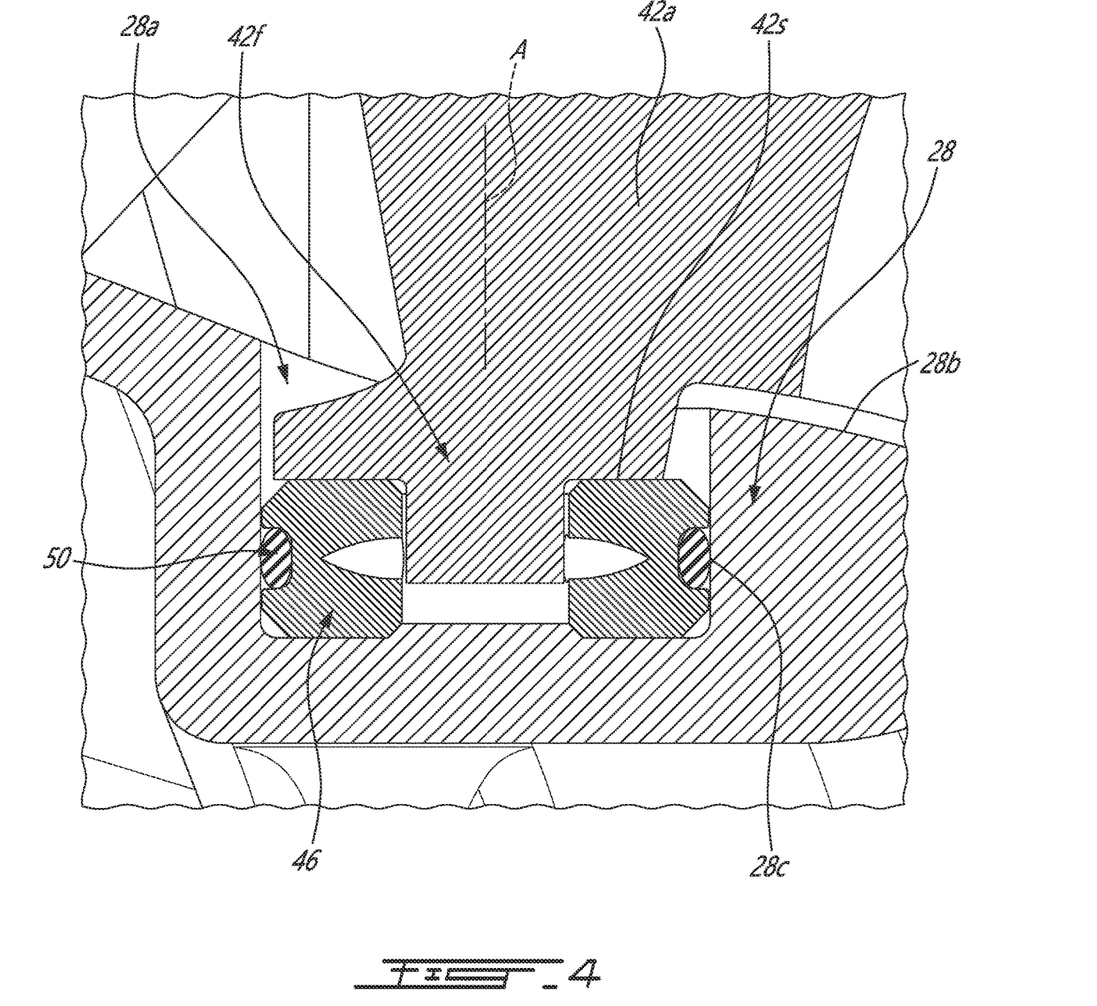
FIG. 4 is an enlarged view of a portion of FIG. 3.

Referring now to FIG. 4, the inner casing 28 defines a plurality of pockets 28a that are circumferentially distributed about the central axis 11. The pockets 28a extends from a gaspath surface 28b of the inner casing 28 toward the central axis 11. The pockets 28a are therefore recessed from the annular gaspath 20. The inner casing 28 defines peripheral walls 28c. Each of the peripheral walls 28c extends circumferentially around a respective one of the spanwise axes A of the vanes 42 and circumscribes a respective one of the pockets 28a. It will be understood that similar pockets may be defined by the outer casing 26 of the engine 10.

The variable guide vane assembly 40 further includes bushings 46. Each of the pockets 28a is sized to receive therein a respective one of the bushings 46. The bushings 46 are rollingly engaged by the inner stems 42f of the vanes 42. In the embodiment shown, the inner stems 42f of the vanes 42 protrude from shoulders 42s of the vanes 42. The shoulders 42s may be annular and are in abutment against annular faces of the bushings 46. The bushings 46 may therefore axially locate the vanes 42 relative to the inner casing 28. A radial gap remains between the inner stem 42f and the bushing 46 to allow relative rotation about the bushing axis B. Also, a radial gap is present between the bushings 46 and the peripheral walls 28c of the pockets 28a to accommodate tolerance stack-up and thermal growth.

The bushings 46 may remain substantially stationary relative to the inner casing 28 and the inner stems 42f may rotate relative to the bushings 46. To this effect, the bushings 46 may be made of any suitable material able to assist rotation of the vanes 42. For instance the bushings 46 may be made of compression molding composite materials. For instance, the bushings 46 may be made of polyamide with 40% carbon fill. Any other suitable composite material may be used. Other materials may be used, such as, graphite, Teflon™, metallic materials, metallic materials impregnated with oil/graphite. Any suitable material that meets the mechanical properties requirements may be used. Materials having tribology properties, such as self-lubricating materials, may be used.

In use, the air flowing in the annular gas path 22 applies forces on the vanes 42. These forces combined with the loose fits between the inner stems 42f and the bushings 46 and between the bushings 46 and the peripheral walls 28c of the pockets 28a may result in the bushings 46 impacting the peripheral walls 28c of the inner casing 28 and may result in increased vibrations. Also, the loose fit between the bushings 46 and the peripheral walls 28c of the pockets 28a allows rotation of the bushings 46 within the pockets 28a. With time, this may cause fretting and premature wear of the inner casing 28. The inner casing 28 may be expensive to replace, and may be a non-replaceable part.

Still referring to FIG. 4, to at least partially alleviate the aforementioned drawbacks, resilient members 50 are disposed radially between surfaces of the inner casing 28 and the bushings 46 relative to the spanwise axes A of the vanes 42. The resilient members 50 may be annular and are in abutment against both of the surfaces of the inner casing 28 and the bushings 46. In the embodiment shown, the resilient members 50 are in abutment against the peripheral walls 28c of the inner casing 28 within the pockets 28a and the bushings 46. The resilient members 50 may be biased or compressed in a radial direction relative to the spanwise axes A by the peripheral walls 28c of the pockets 28a and by the bushings 46. The resilient members 50 may be any suitable means able to exert a radial force on the bushings 46. The resilient members 50 is depicted here as a sealing member, such as an O-ring. However, any suitable sealing member may be used. The resilient member 50 may be made of an elastomeric material. Alternatively, the resilient member 50 may be a metallic C-seal or a split C-seal. The resilient members 50 may assist in locating, centering, and holding the bushings 46 into the pockets 28a thereby minimizing contacts between the bushings 46 and the peripheral wall 28c. The resilient members 50 may further inhibit rotation of the bushings 46 within the pockets 28a. The resilient members 50 are resilient to take up the tolerance stack-up and are able to accommodate thermal growth when the engine 10 is in operation. That is, the bushings 46 may be substantially free of contact with the peripheral walls 28c of the inner casing 28 thanks to the resilient members 50.

The resilient member 50 is used to accommodate a tolerance stack-up and for centering the bushings 46 relative to the pockets 28a to limit contact between the bushings 46 and the peripheral walls 28c circumscribing said pockets 28a. In the present embodiment, the pockets 28a do not extend through the inner casing 28. The resilient members 50 are therefore not used for sealing. However, in some other embodiments, the resilient members 50 may contribute in limiting air from leaking out of the annular gaspath 22 if sealing members are used as the resilient members 50.

Figure 5:
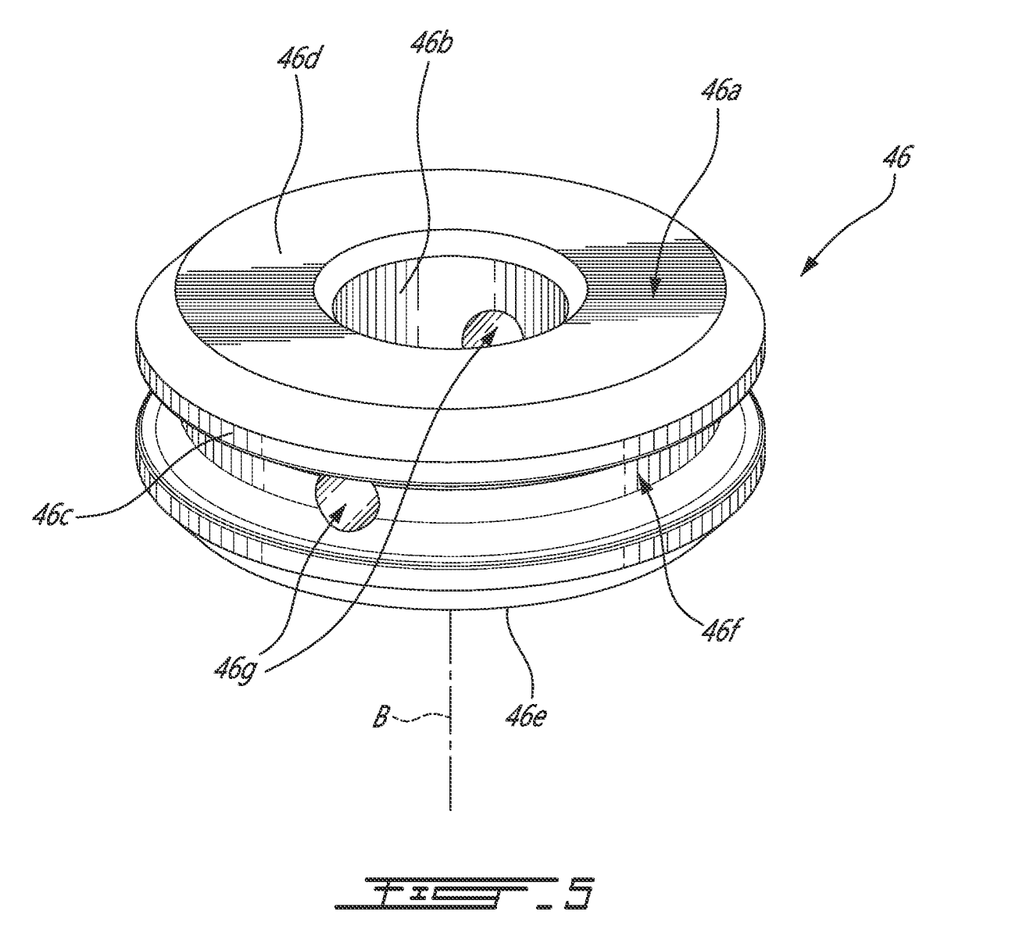
FIG. 5 is a three dimensional view of a bushing in accordance with one embodiment for the VGV assembly of FIG. 3.

Referring now to FIG. 5, one of the bushing 46 is shown in detail. Since the below description may apply to all of the bushings 46, the singular form is used. The bushing 46 includes a body 46a that is annularly extending around a bushing axis B. In the embodiment shown, the body 46a is a single monolithic piece, but may alternatively include more than one pieces assembled together using any suitable means such as, glue, fasteners, lap joints, and so on. The body 46a defines an inner circumferential face 46b, an outer circumferential face 46c that is located radially outwardly of the inner circumferential face 46b relative to the bushing axis B. The inner circumferential face 46b bounds an aperture of the bushing 46 that is sized to accept the inner stem 42f of the vane 42. The body 46a defines a top annular face 46d and a bottom annular face 46e. The top and bottom annular faces 46d, 46e extend radially relative to the bushing axis B from the inner circumferential face 46b to the outer circumferential face 46c. The top annular face 46d is engaged by the shoulder 42s (FIG. 4) of the vane 42. The bottom annular face 46e engages a bottom wall of the inner casing 28; the bottom wall being located in the pockets 28a. In the embodiment shown, chamfers are present at intersection between the annular faces 46d, 46e and the circumferential faces 46b, 46c. These chamfers may facilitate the insertion of the bushing 46 in a respective one of the pockets 28a (FIG. 4) and the insertion of the stem 42f into the bushing 46.

In the depicted embodiment, the body 46a of the bushing 46 defines an annular groove 46f that extends radially from the outer circumferential face 46c toward the inner circumferential face 46b. The groove 46f is sized to accept the resilient member 50. Therefore, movements of the resilient member 50 relative to the bushing 46 in a direction parallel to the bushing axis B may be substantially limited by the groove 46f. A depth of the groove 46f taken in a radial direction relative to the bushing axis B may be less than a diameter of the resilient member 50. In other words, the groove 46f may be sized such that a portion of the resilient member 50 protrudes radially outwardly beyond the outer circumferential face 46c of the body 46a to ensure that the resilient member 50 contacts the peripheral walls 28c (FIG. 4) of the inner casing 28 rather than the bushing 46 contacting said peripheral walls 28c. In an alternate embodiment, the groove may be defined by the peripheral wall 28c of the pocket 28a and the resilient member may be engaged to the peripheral wall 28c within the groove. In an alternate embodiment, both of the bushing 46 and the peripheral wall 28c may define a groove. In some other embodiments, the resilient member 50 may be recessed into the groove or aligned with the outer circumferential face 46c of the bushing 46; the peripheral wall 28c defining an annular bump in register with the groove such that the resilient member 50 contacts the annular bump before the bushing contacts the peripheral wall 28c.

Still referring to FIG. 5, the body 46a of the bushing 46 further defines at least one bore 46g, two bores 46g in the depicted embodiment, that extend in a direction having a radial component relative to the bushing axis B from the inner circumferential face 46b to the groove 46f. These bores 46g are sized to accept a tool to remove the resilient member 50 from the groove 46f during maintenance.

Referring back to FIG. 3, in the embodiment shown the outer casing 26 includes a first section 26a and a second section 26b secured to the first section 26a. The second section 26b is used to rollingly support the unison ring 45 and defines a plurality of apertures 26c that are circumferentially distributed about the central axis 11. The apertures 26c are sized to receive outer bushings 47. A sealing member 48 is received radially between the outer stems 42g and the outer bushings 47. The sealing member 48 is shown here as an O-ring, but any other suitable sealing members may be used. The sealing member 48 is used to limit air from leaking out of the annular pas path 22 via gaps between the outer bushings 47 and the outer stems 42g. In this case, the wear of the second section 26b of the outer casing 26 caused by movements of the outer bushings 47 into the apertures 26c of the outer casing 26 either caused by the air flowing into the annular gaspath 22 and/or by rotation of the outer stems 42g relative to the outer bushings 47 may be acceptable because it may be less time consuming to replace the second section 26b of the outer casing 26 than the inner casing 28. It will nevertheless be appreciated that resilient members as described herein above may be disposed between the outer bushings 47 and peripheral walls circumscribing the apertures 26c of the outer casing 26.

The presence of the resilient member 50 may dampen vibrations and may reduce the risk of fretting and wear caused by the bushing 46 rotating within the inner shroud pocket 28a. The resilient member 50 may also allow for the bushing 46 and shroud 28 to maintain their fit over a wider thermal range than a configuration lacking such a resilient member. This may introduce the possibility of using materials with a larger difference in their thermal coefficients. The proposed design can be retrofitted to existing VGV systems. The proposed design may be especially useful in engines where the inner shroud 28 that holds the bushings 46 is an expensive component. By reducing fretting between the bushing and shroud, there may be less likelihood that the expensive shroud will need to be replaced from wear.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the disclosed bushings with resilient member may be received within pockets defined by the outer casing for rotatably supporting outer stems of the vanes. Also, the variable guide vane assembly has been disclosed as being part of the compressor section of the engine, but may also or in alternatively be part of the turbine section of the engine. Yet further modifications could be implemented by a person of ordinary skill in the art in view of the present disclosure, which modifications would be within the scope of the present technology.

The invention claimed is:

1. A gas turbine engine, comprising:
an annular gaspath extending around a central axis, the annular gaspath defined between a first casing and a second casing, the first casing defining pockets; and
a variable guide vane assembly having:
variable guide vanes circumferentially distributed around the central axis, the variable guide vanes having airfoils extending into the annular gaspath and extending between first and second pivot members at respective first and second ends of the airfoils, the variable guide vanes rotatable about respective spanwise axes,
bushings received within the pockets of the first casing, the first pivot members of the variable guide vanes rollingly engaged to the bushings, and
resilient members disposed radially between surfaces of the first casing and the bushings relative to the spanwise axes, the resilient members in abutment against both of the surfaces of the first casing and the bushings, the resilient members being spacers used to maintain gaps defined radially relative to the respective spanwise axes between the bushings and the surfaces, the bushings connected to the first casing solely via the resilient members.

2. The gas turbine engine of claim 1, wherein the surfaces of the first casing are defined by peripheral walls of the first casing, each of the peripheral walls circumscribing a respective one of the pockets.

3. The gas turbine engine of claim 2, wherein the resilient members are disposed radially between the peripheral walls and the bushings relative to the spanwise axes.

4. The gas turbine engine of claim 1, wherein the bushings define grooves extending circumferentially around the spanwise axes, each of the resilient members being annular and received within a respective one of the grooves.

5. The gas turbine engine of claim 1, wherein the first pivot members are stems protruding from the airfoils along the spanwise axes, the stems rollingly engaged to the bushings by being rotatably received within apertures defined by the bushings.

6. The gas turbine engine of claim 5, wherein the bushings define at least one bore extending outwardly from the apertures towards outer circumferential faces of the bushings, the at least one bore sized to receive a tool.

7. The gas turbine engine of claim 1, wherein the resilient members are made of an elastomeric material.

8. The gas turbine engine of claim 1, wherein the resilient members are sealing members.

9. The gas turbine engine of claim 8, wherein the sealing members are O-rings or C-seals.

10. The gas turbine engine of claim 1, wherein the first casing is located radially inwardly of the second casing relative to the central axis.

11. The gas turbine engine of claim 1, wherein the first casing is made of a metallic material and the bushings are made of a composite material.

12. A gas turbine engine, comprising:
an annular gaspath extending around a central axis, the annular gaspath defined between a first casing and a second casing, the first casing defining pockets; and
a variable guide vane assembly having:
variable guide vanes circumferentially distributed around the central axis, the variable guide vanes having airfoils extending into the annular gaspath and extending between first and second pivot members at respective first and second ends of the airfoils, the variable guide vanes rotatable about respective spanwise axes,
bushings received within the pockets of the first casing, the first pivot members of the variable guide vanes rollingly engaged to the bushings, and
resilient members disposed radially between surfaces circumscribing the pockets and the bushings relative to the spanwise axes, the resilient members in abutment against both of the surfaces of the first casing and the bushings, the bushings free of contact with the surfaces.

13. The of claim 12, wherein the resilient members are sealing members.

14. The gas turbine engine of claim 12, wherein the bushings define grooves extending circumferentially around the spanwise axes, each of the resilient members being annular and received within a respective one of the grooves.

15. The gas turbine engine of claim 12, wherein the first pivot members are stems protruding from the airfoils along the spanwise axes, the stems rollingly engaged to the bushings by being rotatably received within apertures defined by the bushings.

16. The gas turbine engine of claim 15, wherein the bushings define at least one bore extending outwardly from the apertures towards outer circumferential faces of the bushings, the at least one bore sized to receive a tool.

17. The gas turbine engine of claim 12, wherein the resilient members are made of an elastomeric material.

18. The gas turbine engine of claim 12, wherein the first casing is located radially inwardly of the second casing relative to the central axis.

19. The gas turbine engine of claim 12, wherein the first casing is made of a metallic material and the bushings are made of a composite material.

* * * * *